(12) United States Patent
Wang et al.

(10) Patent No.: US 12,273,006 B2
(45) Date of Patent: Apr. 8, 2025

(54) OUTER-ROTOR BRUSHLESS MOTOR AND HOUSING THEREOF

(71) Applicant: SHENZHEN TOPBAND CO., LTD., Shenzhen (CN)

(72) Inventors: Xingwei Wang, Shenzhen (CN); Yong Bu, Shenzhen (CN)

(73) Assignee: SHENZHEN TOPBAND CO., LTD., Shenzhen (CN)

( * ) Notice: Subject to any disclaimer, the term of this patent is extended or adjusted under 35 U.S.C. 154(b) by 401 days.

(21) Appl. No.: 17/793,653

(22) PCT Filed: Jul. 30, 2020

(86) PCT No.: PCT/CN2020/105802
§ 371 (c)(1),
(2) Date: Jul. 19, 2022

(87) PCT Pub. No.: WO2021/237931
PCT Pub. Date: Dec. 2, 2021

(65) Prior Publication Data
US 2023/0088636 A1    Mar. 23, 2023

(30) Foreign Application Priority Data

May 28, 2020 (CN) .......................... 202020941057.2

(51) Int. Cl.
  *H02K 5/20*    (2006.01)
  *H02K 9/06*    (2006.01)
  *H02K 11/33*    (2016.01)

(52) U.S. Cl.
  CPC ................ *H02K 5/20* (2013.01); *H02K 9/06* (2013.01); *H02K 11/33* (2016.01)

(58) Field of Classification Search
  None
  See application file for complete search history.

(56) References Cited

U.S. PATENT DOCUMENTS

| | | | |
|---|---|---|---|
| 2008/0116753 A1* | 5/2008 | Carlucci ................ | H02K 7/145 388/816 |
| 2015/0069864 A1* | 3/2015 | Nagahama ............. | H02K 3/522 310/50 |
| 2023/0079456 A1* | 3/2023 | Wang ....................... | H02K 9/06 310/62 |

FOREIGN PATENT DOCUMENTS

| CN | 103532299 A | 1/2014 |
|---|---|---|
| CN | 207819620 U | 9/2018 |

OTHER PUBLICATIONS

Machine translation of Ishikawa [CN 103532299A] (Year: 2014).*
(Continued)

*Primary Examiner* — Bernard Rojas
(74) *Attorney, Agent, or Firm* — Andrew C. Cheng

(57) ABSTRACT

The present invention discloses an outer-rotor brushless motor and a housing thereof. The housing is applicable to an outer-rotor brushless motor. The outer-rotor brushless motor includes a spindle, a stator holder mounted on a lower portion of the spindle through a bearing, and an outer rotor assembly fixedly mounted on an upper portion of the spindle. The housing comprises a cavity with a bottom being open, and covers the outer rotor assembly. At least one platform extends outwards from a bottom of a side wall of the housing, and is detachably fixed to the stator holder to form air inlet gaps. Multiple air outlet openings corresponding to the outer rotor assembly are formed in the side wall of the housing in a circumferential direction. The motor can be effectively protected and cooled.

11 Claims, 2 Drawing Sheets

(56) References Cited

OTHER PUBLICATIONS

Machine translation of Jinhao [CN 207819620U] (Year: 2018).*
International Search Report of PCT Patent Application No. PCT/CN2020/105802 issued on Mar. 1, 2021.

* cited by examiner

OUTER-ROTOR BRUSHLESS MOTOR AND HOUSING THEREOF

FIELD

The invention relates to the field of motors, in particular to an outer-rotor brushless motor and a housing thereof.

BACKGROUND

Most existing outer-rotor motors are exposed to the air and unprotected, so conventional outer-rotor motors cannot meet use requirements in an application scenario where a motor protection is needed.

SUMMARY

The technical issue to be settled by the invention is to overcome the defects of the prior art by providing an outer-rotor brushless motor and a housing thereof.

A housing, being applicable to an outer-rotor brushless motor which comprises a spindle, a stator holder mounted on a lower portion of the spindle through a bearing, and an outer rotor assembly fixedly mounted on an upper portion of the spindle.

The housing comprises a cavity with a bottom being open, and covers the outer rotor assembly.

At least one platform extends outwards from a bottom of a side wall of the housing, and is detachably fixed to the stator holder to form air inlet gaps therebetween.

Multiple air outlet openings corresponding to the outer rotor assembly are formed in the side wall of the housing in a circumferential direction.

Preferably, in the housing of the present invention, an accommodating portion for accommodating an auxiliary bearing in loose fit with the spindle is disposed at an inner top of the housing.

Preferably, in the housing of the present invention, multiple first partition plates are disposed on two sides of each of the air inlet gaps to form a louvered air inlet with multiple air inlet openings, and multiple second partition plates are disposed on two sides of each said air outlet opening to form a louvered air outlet.

Preferably, in the housing of the present invention, the first partition plates are integrated with the platform or the stator holder to form at least one louvered air inlet of which the air inlet openings are spaced from each other in a horizontal direction; or, the first partition plates are movably connected to the platform and the stator holder to form the louvered air inlet of which the multiple air inlet openings are spaced from each other in the horizontal direction.

Preferably, in the housing of the present invention, the second partition plates are integrated with a body of the housing, or, the second partition plates are movably connected to the two sides of the air outlet opening.

Preferably, in the housing of the present invention, the second partition plates are horizontally disposed on the two sides of each of the air outlet openings to form the louvered air outlet of which the air outlet openings are spaced from each other in a vertical direction.

The present invention further provides an outer-rotor brushless motor which comprises an outer-rotor brushless motor body and the housing described above.

Preferably, in the outer-rotor brushless motor of the present invention, the stator holder is provided with at least two convex mounting portions which are detachably connected and fixed to the platform to space the platform apart from the stator holder to form the air inlet gaps.

Preferably, in the outer-rotor brushless motor of the present invention, the outer rotor assembly is provided with multiple blades which are vertically distributed at intervals and correspond to the air outlet openings.

The housing provided by the invention can effectively protect the motor and assist the motor body in heat dissipation; and compared with internal-rotor motors on the same power level, the outer-rotor brushless motor provided by the invention has a lower weight and a smaller installation space, and has the features of large power density and torque density of outer-rotor motors.

BRIEF DESCRIPTION OF THE DRAWINGS

The invention will be further expounded below in conjunction with accompanying drawings and embodiments. In the figures.

DESCRIPTION OF THE EMBODIMENTS

To gain a better understanding of the technical features, purposes and effects of the invention, specific implementations of the invention will be described in detail below with reference to the accompanying drawings.

Figure 1:
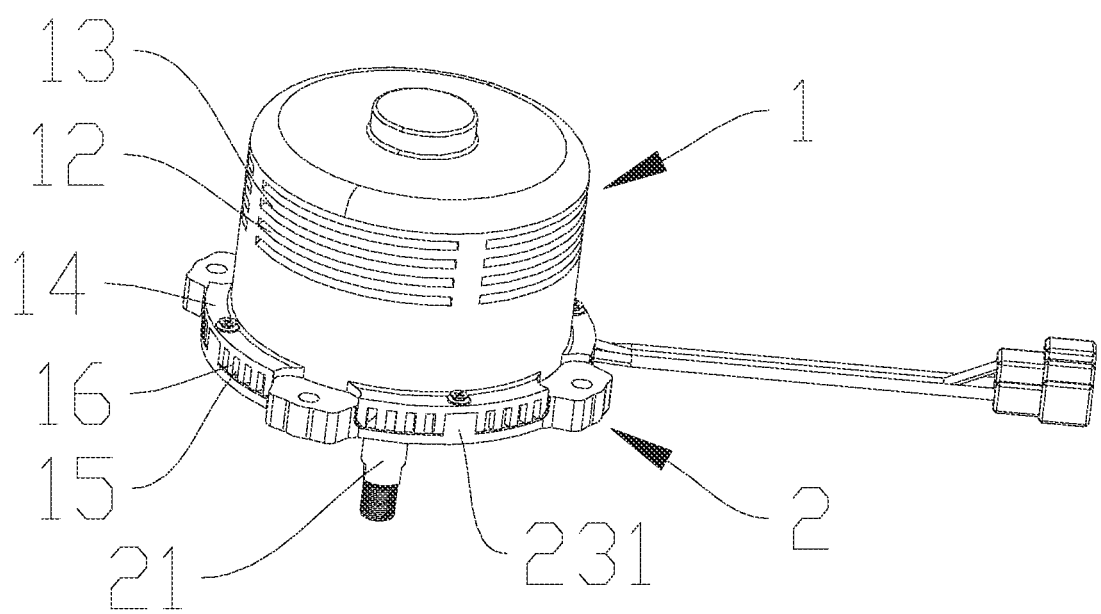
FIG. 1 is a first structural diagram of an outer-rotor brushless motor and a housing thereof according to the invention.

Definition of directions: in use, "upper", "lower", "top" and "bottom" in the invention should be construed according to the directions defined by "upper", "lower", "top" and "bottom" shown in FIG. 1. It should be understood that terms such as "upper", "lower", "top" and "bottom" are used to indicate directional or positional relationships based on the accompanying drawings and imply that a device or element referred to should be configured and operated in a specific direction merely for the purpose of facilitating the description of the invention, do not indicate that the device or element referred to must be in a specific direction, and thus should not be construed as limitations of the invention.

Figure 2:
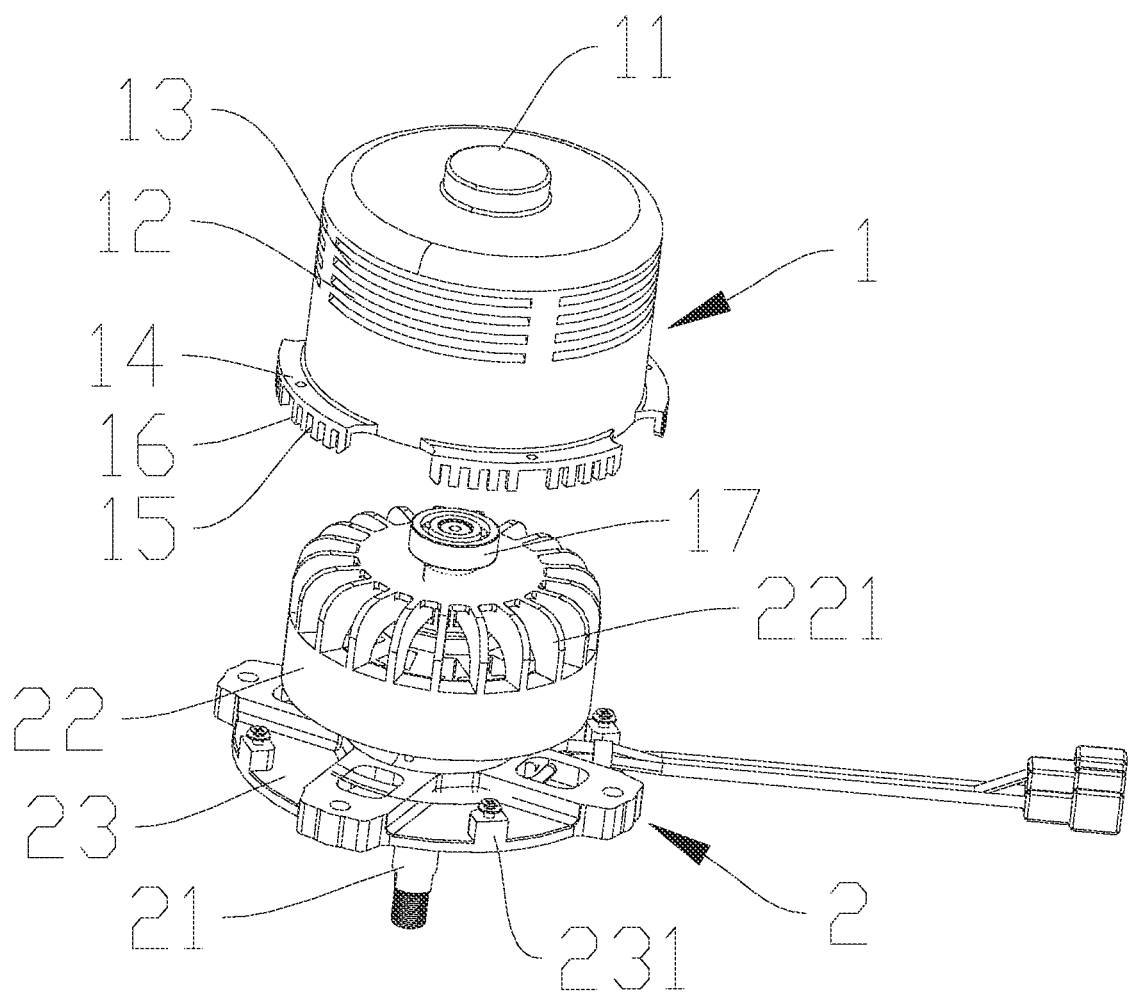
FIG. 2 is a second structural diagram of the outer-rotor brushless motor and the housing thereof according to the invention.

First embodiment: as shown in FIG. 1, the invention provides a housing which is applicable to an outer-rotor brushless motor 2. As shown in FIG. 2, the outer-rotor brushless motor 2 comprises a spindle 21, a stator holder 23 mounted on a lower portion of the spindle 21 through a bearing, and an outer rotor assembly fixedly mounted on an upper portion of the spindle 21. The housing 1 comprises a cavity with a bottom being open and covers the outer rotor assembly 22. At least one platform 14 extends outwards from a bottom of a side wall of the housing 1, and is detachably fixed to the stator holder 23 with at least one air inlet gaps formed therebetween. Multiple air outlet openings corresponding to the outer rotor assembly 22 are formed in the side wall of the housing 1 in a circumferential direction, and air convection is realized through the air inlet gaps and the air outlet openings, so that the motor is effectively cooled.

Specifically, in some embodiments, the housing 1 is cylindrical, an accommodating portion 11 for accommodating an auxiliary bearing 17 is provided at an inner top of the housing 1 and is an accommodating space formed by upward protruding of the inner top of the housing 1. The auxiliary bearing 17 is in loose fit with the spindle 21, so that low vibrations of the housing are guaranteed in operation of the motor, and the operating stability of the motor is ensured.

In this embodiment, four platforms 14 extend outwards from the bottom of the side wall of the housing 1 and are equally spaced apart from each other, and the platforms 14 are detachably connected and fixed to the stator holder 23 to form at least four air inlet gaps. Preferably, middle portions of the platforms 14 are connected and fixed to mounting portions 231 on the stator holder 23, two ends of each platform 14 abut against other protruding parts on the stator holder 23, so that eight air inlet gaps are formed. In some embodiments, multiple first partition plates 16 are disposed on two sides of each air inlet gap to form a louvered air inlet 15, and multiple second partition plates 13 are disposed on two sides of each air outlet openings 12 to form a louvered air outlet 12, so that heat dissipation is guaranteed, and dust is prevented from entering the motor, thus meeting the IPX1 protection requirements.

In some embodiments, the first partition plates 16 are integrated with each of the platform 14 or the stator holder 23 to form a vertical louvered air inlet 15; or, the first partition plates 16 are individual structures and are movably connected to each of the platform 14 and the stator holder 23 to form a vertical louvered air inlet 15. Optionally, cylindrical posts are disposed at two ends of each first partition plate 16, holes are formed in the platform 14 and the stator holder 23, and the cylindrical posts are in interference fit with the holes and are able to rotate in the holes. In the present invention, the vertical louvered air outlet 15 means the air outlet openings extending vertically and adjacent air outlet openings are spaced from each other in a horizontal direction.

In some embodiments, the second partition plates 13 are integrated with a main body of the housing 1; or, the second partition plates 13 are individual structures and are movably connected to two sides of the air outlet openings. Optionally, cylindrical posts are disposed at two ends of each second partition plate 13, holes are formed in the main body of the housing 1, and the cylindrical posts are in interference fit with the holes and are able to rotate in the holes. To meet the IPX6 protection requirements, a housing without air inlet and air outlet opening may be applied, or the first partition plates 16 and the second partition plates 13 may be rotated to seal the air inlet gaps and the air outlet openings. Thus, the first partition plates 16 and the second partition plates 13 may be rotated to meet the IPX1 to IPX6 protection requirements.

In some embodiments, the second partition plates 13 may be vertically or horizontally disposed on the two sides of the air outlet openings. Preferably, in this embodiment, the second partition plates 13 are horizontally disposed on the two sides of each of the air outlet openings to form a horizontal louvered air outlet, which correspond to and are matched with multiple blades 221 that are vertically distributed on the outer rotor assembly 22 at intervals, so that a better cooling effect is realized. In the present invention, the horizontal louvered air outlet 12 means the air outlet openings extending horizontally and adjacent air outlet openings are spaced from each other in a vertical direction.

Second embodiment: the invention further provides an outer-rotor brushless motor, comprising an outer-rotor brushless motor body, and the housing 1 described in the first embodiment, which will no longer be detailed here.

In some embodiments, at least two convex mounting portions 231 are disposed on the stator holder 23, and each of the mounting portions 231 is detachably connected and fixed to the platform 14 to space the platform 14 apart from the stator holder 23, so that air inlet gaps are formed. Wherein, the mounting portions 231 may be mounted and fixed on the platform 14 with screws.

In this embodiment, the outer-rotor assembly 22 is provided with multiple blades 221, which are circumferentially distributed at intervals and correspond to the air outlet openings, so when the blades 221 rotate, heat can be dissipated more smoothly via the horizontal louvered air outlet 12.

The housing provided by the invention can effectively protect the motor and assist the motor body in heat dissipation; and compared with internal-rotor motors on the same power level, the outer-rotor brushless motor provided by the invention has a lower weight and a smaller installation space, and has the features of large power density and torque density of outer-rotor motors.

It may be understood that the above embodiments are specifically described in detail to express some preferred implementations of the invention, and should not be construed as limitations of the scope of the patent of invention. It should be noted that those ordinarily skilled in the art may combine the above technical features at will and can also make some transformations and improvements without departing from the concept of the invention, and all these combinations, transformations and improvements fall within the protection scope of the invention. Therefore, all equivalent transformations and modifications made according to the scope of the claims of the invention should fall within the scope of the claims of the invention.

The invention claimed is:

1. A housing, being applicable to an outer-rotor brushless motor (2) which comprises a spindle (21), a stator holder (23) mounted on a lower portion of the spindle (21) through a bearing, and an outer rotor assembly (22) fixedly mounted on an upper portion of the spindle (21), wherein:
   the housing (1) comprises a cavity with a bottom being open, and covers the outer rotor assembly (22);
   at least one platform (14) extends outwards from a bottom of a side wall of the housing (1), and is detachably fixed to the stator holder (23) to form an air inlet gap therebetween;
   multiple air outlet openings corresponding to the outer rotor assembly (22) are formed in the side wall of the housing (1) in a circumferential direction;
   wherein multiple first partition plates (16) are spacedly disposed on two sides of the air inlet gap to form a louvered air inlet (15) with multiple air inlet openings, and multiple second partition plates (13) are disposed on two sides of each of the air outlet openings to form a louvered air outlet (12).

2. The housing according to claim 1, wherein an accommodating portion (11) for accommodating an auxiliary bearing (17) in loose fit with the spindle (21) is disposed at an inner top of the housing (1).

3. The housing according to claim 1, wherein
   the multiple first partition plates (16) are integrated with the at least one platform (14) or the stator holder (23) to form at least one louvered air inlet (15) of which the multiple air inlet openings are spaced from each other in a horizontal direction; or,
   the multiple first partition plates (16) are movably connected to the platform (14) and the stator holder (23) to form the at least one louvered air inlet (15) of which the multiple air inlet openings are spaced from each other in a horizontal direction.

4. The housing according to claim 1, wherein the multiple second partition plates (13) are integrated with a body of the housing (1); or, the multiple second partition plates (13) are movably connected to the two sides of each of the multiple air outlet openings.

5. The housing according to claim 1, wherein the multiple second partition plates (13) are horizontally disposed on the two sides of each of the air outlet openings to form the louvered air outlet (12) of which the air outlet openings are spaced from each other in a vertical direction.

6. An outer-rotor brushless motor, comprising an outer-rotor brushless motor body, and the housing (1);
   wherein the housing (1) comprises a cavity with a bottom being open, and covers the outer rotor assembly (22);
   at least one platform (14) extends outwards from a bottom of a side wall of the housing (1), and is detachably fixed to the stator holder (23) to form an air inlet gap therebetween;
   multiple air outlet openings corresponding to the outer rotor assembly (22) are formed in the side wall of the housing (1) in a circumferential direction;
   an accommodating portion (11) for accommodating an auxiliary bearing (17) in loose fit with the spindle (21) is disposed at an inner top of the housing (1), and
   the stator holder (23) is provided with at least two convex mounting portions (231), and each of the at least two convex mounting portions (231) is detachably fixed to the platform (14) to space the platform (14) apart from the stator holder (23) to form the air inlet gap.

7. An outer-rotor brushless motor comprising an outer-rotor brushless motor body, and a housing (1);
   wherein the outer-rotor brushless motor body comprises a spingle (21), a stator holder (23) mounted on a lower portion of the spindle (21) through a bearing, and an outer rotor assembly (22) fixedly mounted on an upper portion of the spindle (21);
   the housing (1) comprises a cavity with a bottom being open, and covers the outer rotor assembly (22);
   at least one platform (14) extends outwards from a bottom of a side wall of the housing (1), and is detachably fixed to the stator holder (23) to form an air inlet gap therebetween;
   multiple air outlet openings corresponding to the outer rotor assembly (22) are formed in the side wall of the housing (1) in a circumferential direction; and
   the outer rotor assembly (22) is provided with multiple blades (221) which are vertically distributed at intervals and correspond to the multiple air outlet openings.

8. The outer-rotor brushless motor according to claim 6, wherein multiple first partition plates (16) are disposed on two sides of the at least one air inlet gap to form a louvered air inlet (15), and multiple second partition plates (13) are disposed on two sides of each of the multiple air outlet openings to form a louvered air outlet (12).

9. The outer-rotor brushless motor according to claim 7, wherein the multiple first partition plates (16) are integrated with the at least one platform (14) or the stator holder (23) to form at least one louvered air inlet (15) of which the air inlet gap is spaced from each other in a horizontal direction; or, the multiple first partition plates (16) are movably connected to the platform (14) and the stator holder (23) to form the at least one louvered air inlet (15) of which the air inlet gap is spaced from each other in a horizontal direction.

10. The outer-rotor brushless motor according to claim 7, wherein the multiple second partition plates (13) are integrated with a body of the housing (1); or, the multiple second partition plates (13) are movably connected to the two sides of each of the multiple air outlets.

11. The outer-rotor brushless motor according to claim 7, wherein the multiple second partition plates (13) are horizontally disposed on the two sides of each of the air outlet to form the louvered air outlet (12) of which the air outlet openings are spaced from each other in a vertical direction.

* * * * *